United States Patent

Myers

[11] Patent Number: 5,836,051
[45] Date of Patent: Nov. 17, 1998

[54] TROLLEY HANDLE UNIT

[76] Inventor: Robert Myers, Uplands, Kemnal Road, Chislehurst BR7 6LT Kent, England

[21] Appl. No.: 817,075
[22] PCT Filed: Sep. 10, 1995
[86] PCT No.: PCT/GB95/02380
   § 371 Date: Apr. 4, 1997
   § 102(e) Date: Apr. 4, 1997
[87] PCT Pub. No.: WO96/11130
   PCT Pub. Date: Apr. 18, 1996

[30] Foreign Application Priority Data

Oct. 7, 1994 [GB] United Kingdom ............... 9420301
Mar. 31, 1995 [GB] United Kingdom ............... 9506618

[51] Int. Cl.⁶ ........................................ A47B 95/02
[52] U.S. Cl. ............... 16/111 R; 16/110 R; 280/33.992
[58] Field of Search ................... 16/110 R, 111 R, 16/110.5; 280/33.992; 235/1 R, 1 D; D34/21, 27; D18/1, 2, 6, 7, 11

[56] References Cited

U.S. PATENT DOCUMENTS

| D. 287,370 | 12/1986 | Stoll et al. ............... D18/7 |
| D. 321,577 | 11/1991 | Ellis et al. ............... 280/33.992 |
| D. 351,404 | 10/1994 | Hood et al. ............... 235/1 D |
| 3,251,543 | 5/1966 | Bush ............... 280/33.992 |
| 3,265,297 | 8/1966 | Behrens ............... 235/1 R |
| 3,710,108 | 1/1973 | Haarhaus et al. ............... 235/79 |
| 5,176,392 | 1/1993 | Graebe, Jr. ............... 280/33.992 |
| 5,425,546 | 6/1995 | Gerber et al. ............... 280/33.992 |

FOREIGN PATENT DOCUMENTS

| 133235 | 7/1984 | European Pat. Off. . |
| 8614948 | 1/1987 | United Kingdom . |
| 9000149 | 6/1990 | United Kingdom . |
| 4235473 | 4/1994 | United Kingdom . |
| 9114984 | 10/1991 | WIPO . |
| 9319967 | 10/1993 | WIPO . |

Primary Examiner—Chuck Mah
Attorney, Agent, or Firm—Dowell & Dowell, P.C.

[57] ABSTRACT

A handle unit for shopping trolley formed of a molded material comprising a central housing having hand grip portions extending from either side thereof and wherein a front face of the housing includes an information panel adapted to provide information to a user and wherein the housing includes electronically operated equipment including a bar-code reader which may be connected to an electronically operated display screen.

12 Claims, 5 Drawing Sheets

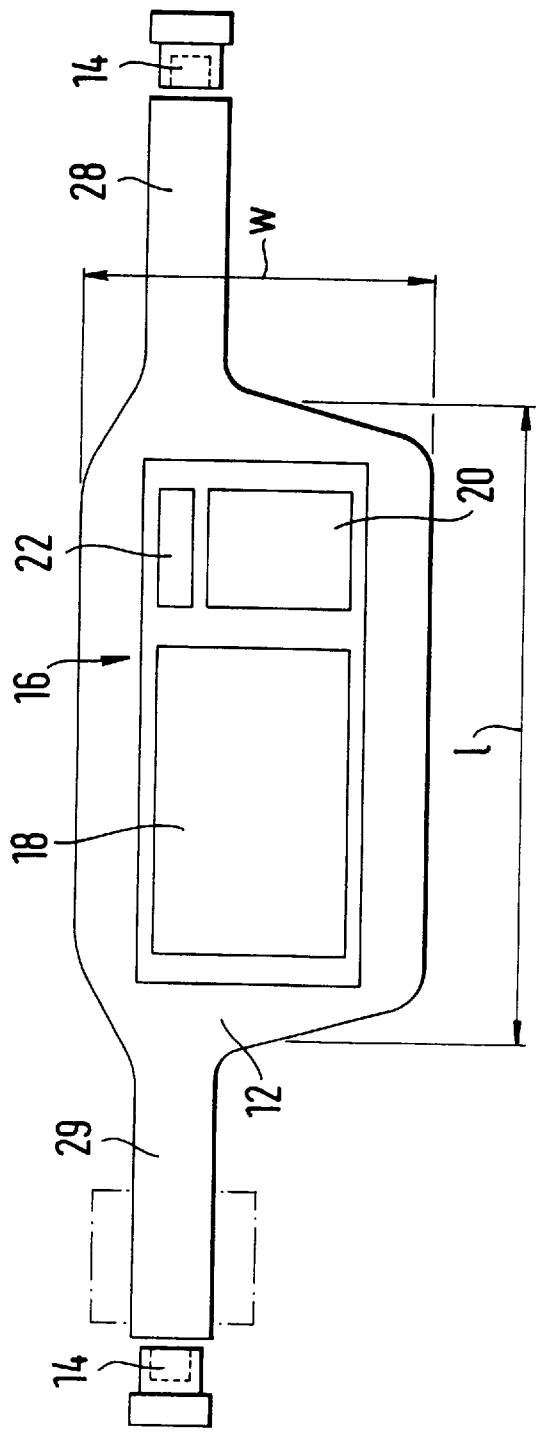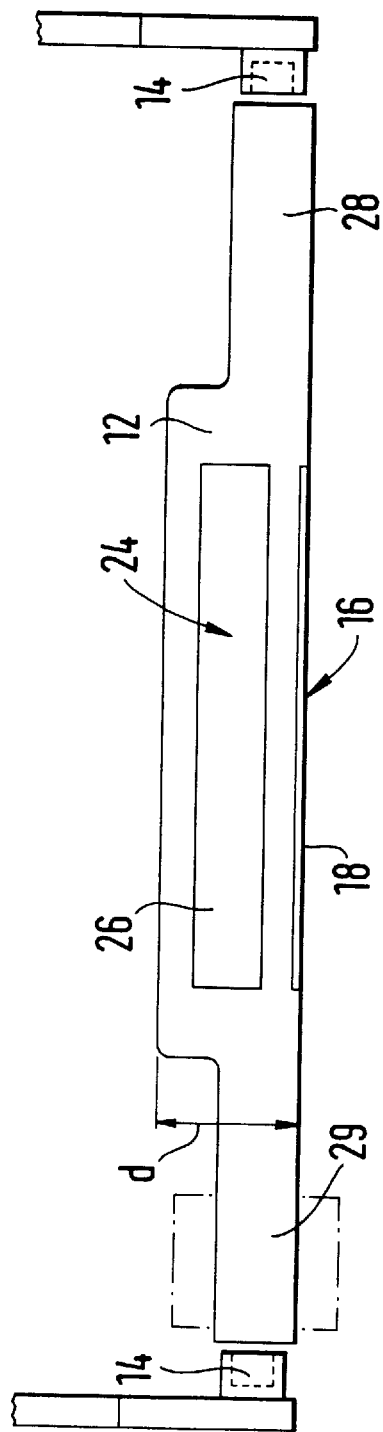

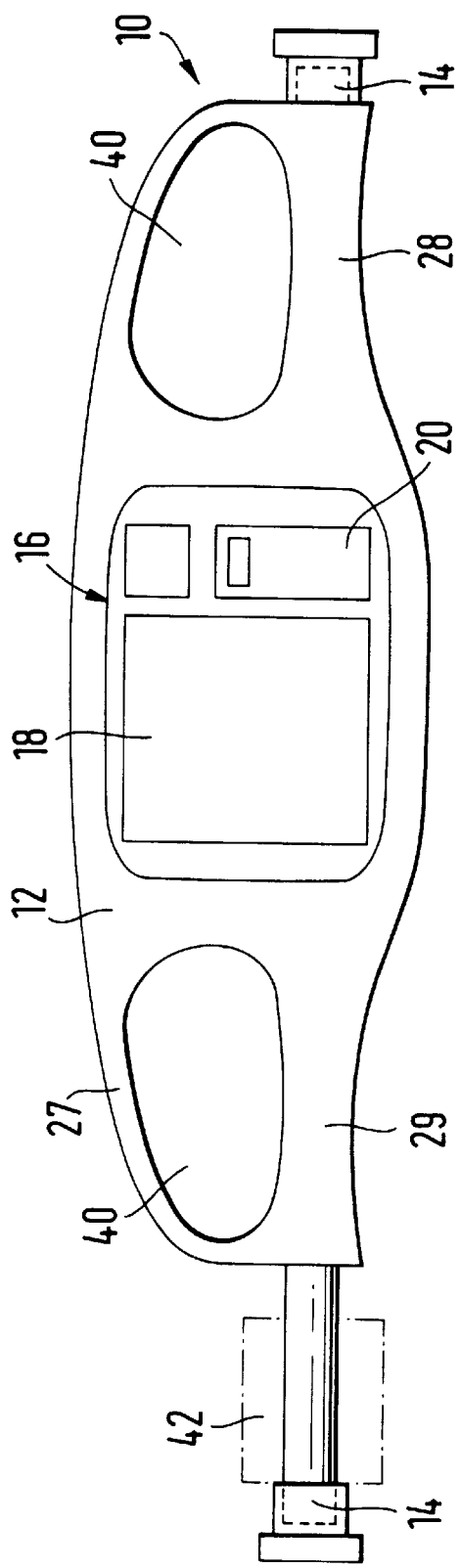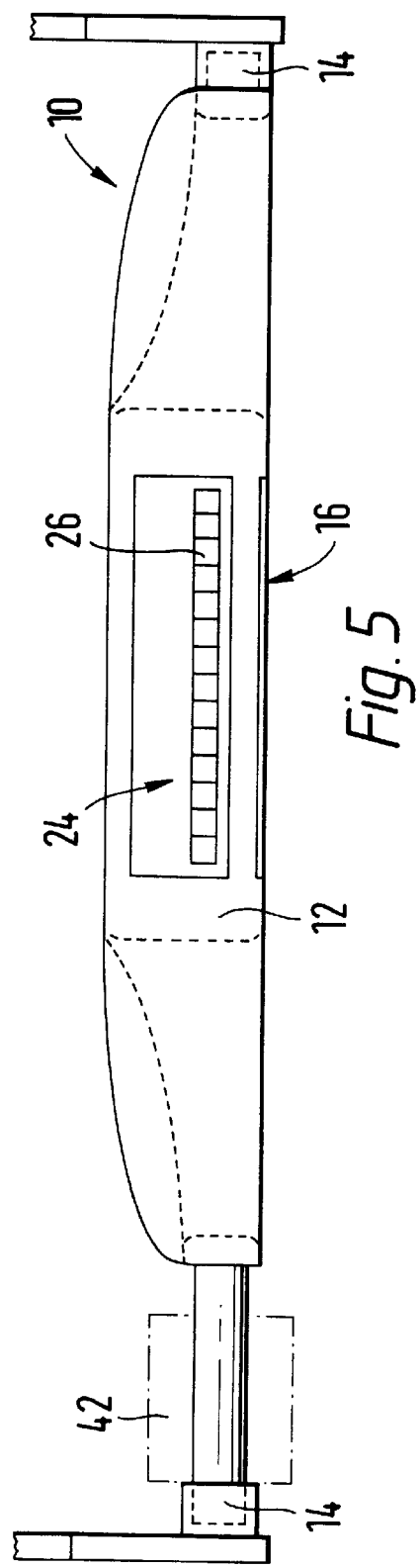

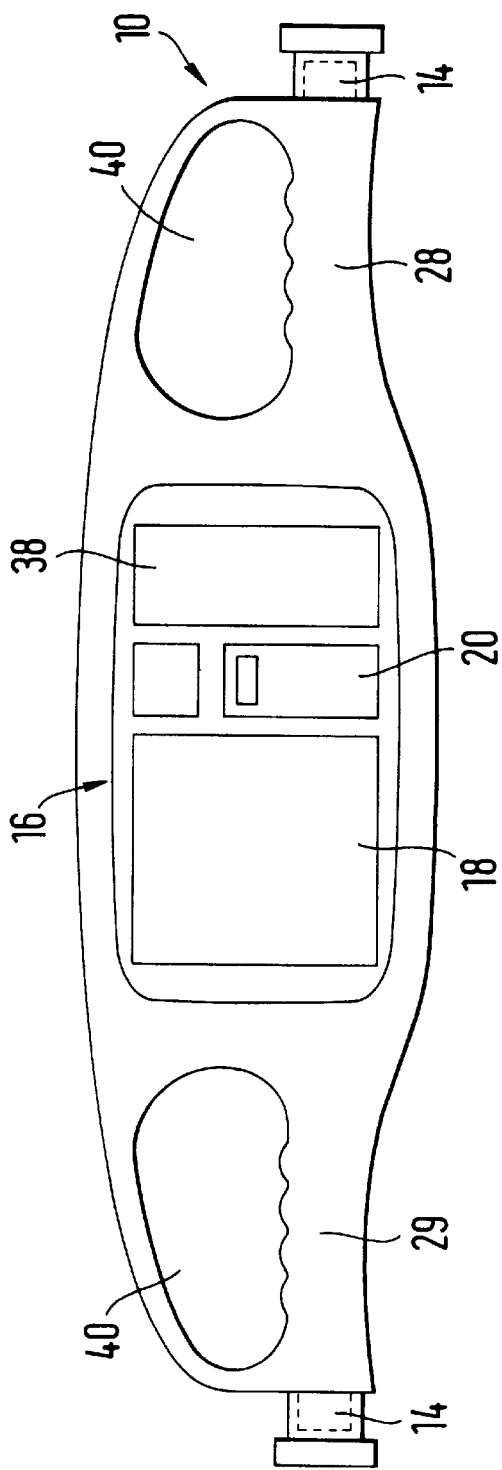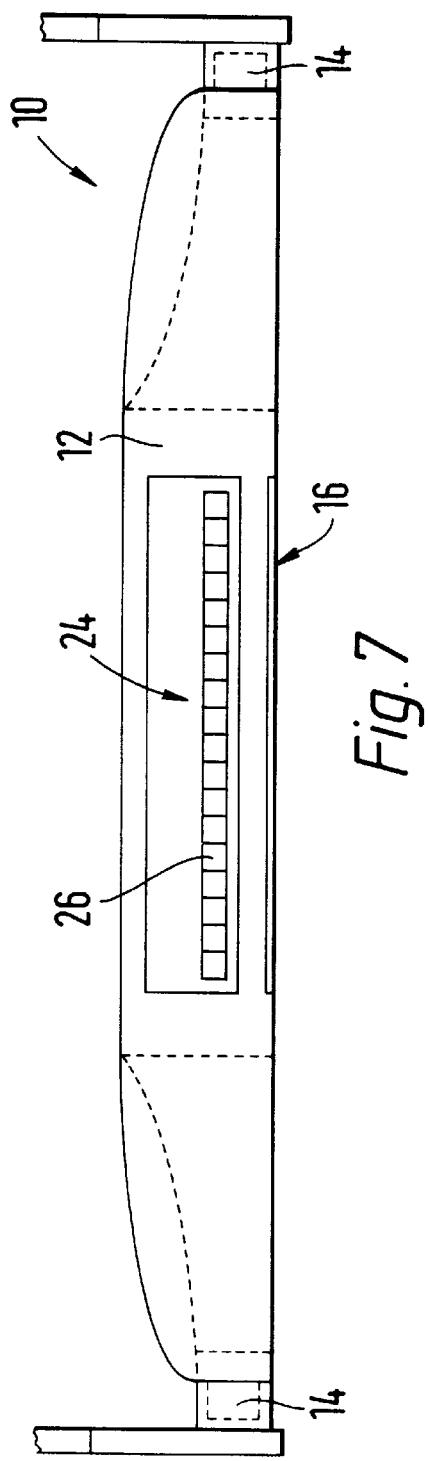

TROLLEY HANDLE UNIT

BACKGROUND OF THE INVENTION

1. Field of the Invention

The present invention relates to a handle unit for a trolley.

2. History of the Prior Art

A conventional trolley such as one used in a supermarket has a plastics coated tubular metal handle which is fastened at each end to a respective side frame of the trolley by means of a resilient plastic fitting. This fitting is designed to receive and retain a tubular handle of a particular radius but can be used to fit handles of different lengths to accommodate trolleys of different widths.

Typically the plastic coating of the handle is marked with the name of the supermarket providing it.

Very recently, trolley handles in supermarkets have been provided with a calculator for the customer to calculate the cost of purchases while using the trolley. A calculator unit was attached to the conventional trolley handle using metal clips.

SUMMARY OF THE INVENTION

According to one aspect, the present invention provides a handle unit for a trolley comprising an integral panel for providing information to the user.

In this way the trolley handle unit provides the user with utilities and useful information.

The handle unit may be molded from plastics material such as polypropylene which may be colored in accordance with the supermarket's corporate identity.

Desirably, the handle unit has a hand gripping portion to either side of the panel. These hand gripping portions may be specially dimensioned and shaped to give the user a comfortable grip of the trolley handle unit.

The trolley handle unit is preferably adapted for use with conventional trolleys and their fittings. For instance the handle unit may be adapted to fit over the conventional tubular trolley handle or have ends dimensioned to cooperate with conventional fittings for attaching the handle to the trolley frame.

Preferably the panel includes a display area, for displaying information without user input, which should be at least partially protected by a transparent cover.

Preferably the handle unit incorporates a housing to the rear of the panel which may receive a power supply. The panel may then include an electronic display screen which can operate from the power supply.

According to another aspect, the present invention provides a trolley incorporating a handle unit comprising an integral panel for providing information to the user. The handle unit may be integral with the trolley.

Further features and advantages of the present invention will be apparent from the following description and accompanying claims.

BRIEF DESCRIPTION OF THE DRAWINGS

Preferred embodiments of the present invention will now be described, by way of example, with reference to the accompanying drawings, in which:

FIG. 1 is a front elevation of a trolley handle unit forming a first embodiment of the present invention;

FIG. 2 is a plan view of the handle unit of FIG. 1:

FIG. 4 is a front elevation of a trolley handle unit forming a second embodiment of the present invention;

FIG. 5 is a plan view of the handle unit of FIG. 3:

FIG. 6 is a front elevation of a trolley handle unit forming a third embodiment of the present invention;

FIG. 7 is a plan view of the handle unit of FIG. 6. and

DESCRIPTION OF THE PREFERRED EMBODIMENTS

Figure 3:
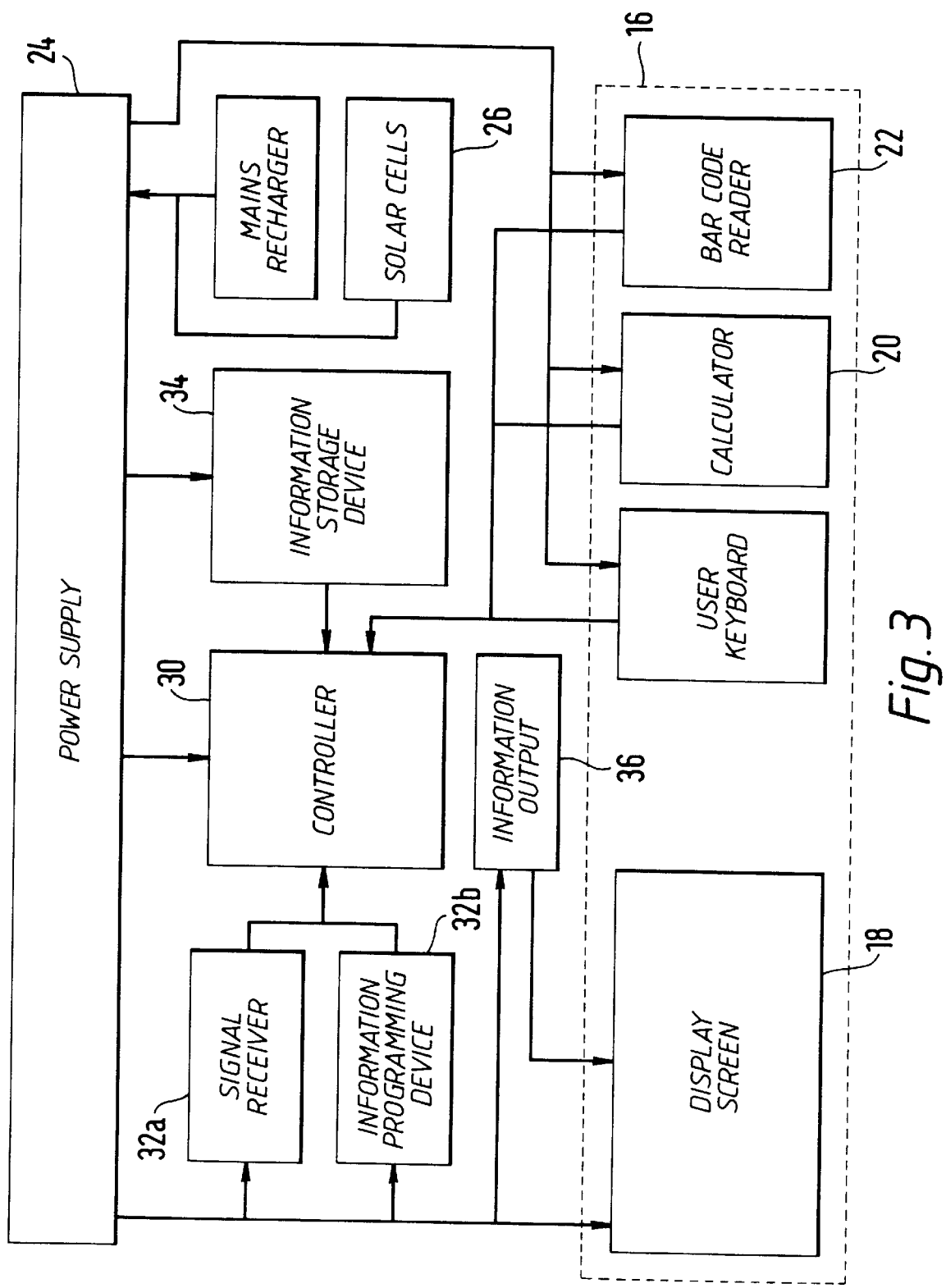
FIG. 3 is a block diagram of a control unit incorporated within the handle unit of FIG. 1.

FIGS. 1 and 2 illustrate a first embodiment of the present invention comprising a handle unit 10 particularly designed for use on a shopping trolley (in the USA called a "shopping cart"). The handle unit 10 is molded in one piece from suitable plastics such as polypropylene and includes a specially dimensioned integral central housing 12 with hand gripping portion 28 and 29 to either side. The ends 14 of the handle unit 10 are tubular and are dimensioned to fit snugly over the conventional tubular metal handle which is preferably retained for support. The hand gripping portions 28 and 29 are thus of greater diameter than the conventional trolley handle and are consequently easier and more comfortable to grip.

The length of the handle unit 10 is the same length as the length of a conventional trolley handle between the fittings to the trolley frame, which is typically between 43.18 and 58.45 cm.

The central housing 12 is shaped and dimensioned in a unique way. In particular, it takes the approximate form of a parallelepiped having a length 1 of 21–25.5 cm. a width w of 12–16 cm and a depth of 4–7 cm. It will be appreciated that the dimensions of the housing 12 can be varied.

The rear face may be slightly smaller than the front face and part of its surface may be sloped or curved to increase the volume of the housing and/or to accommodate the shape of the articles to be housed in it. In particular the lower part of the rear surface is preferably angled, in use, in the opposite direction to the vertical to the upper part of the rear surface in order to aid drainage of water from the handle unit.

The length of the housing, in use, lies along the axis of the handle.

The handle unit 10 is designed so that it can be readily steam cleaned and is hermetically sealed from the environment so that it is completely weather-proof.

Referring now to FIG. 3, the central housing 12 contains a control unit comprising a power source, a controller such as a microprocessor, and information receiving, storage and output devices.

The front of the control unit, which corresponds to the front face of the housing 12, forms a rectangular information panel 16 for providing information to the user. Accordingly, the front face of the housing 12 has an aperture through which the display screen of the control unit can be viewed. In the preferred embodiments, the information panel is 20 cm by 10.5 cm approximately and includes an electronically operated display screen 18: forming a rectangular display area of 12 cm by 10.5 cm approximately, for displaying various information for the customer. Typically, the information displayed on the screen includes details of the various special offers in the store, advertisements of products, a clock display etc. The display screen may be, for example, an LCD display or a mini television screen.

The information panel 16 further includes, in this embodiment, a rectangular user interface area of 8 cm by 10.5 cm approximately which has a calculator 20 and/or a bar code reader 22 to enable the user to make calculations of eg. the cost of his or her purchases, thereby providing additional information to the customer. The bar code reader 22 may have its own display screen or may utilize the display screen 16 in the display area.

It will be appreciated that the information panel 16 could include in the information interface area, a keyboard for the user to input a request for specific information such as the location of a particular type of product in store. Alternatively the display area may include a touch sensitive screen for the same purpose.

It will be noted that the parts of the information panel 16 lie in substantially one plane so that the panel has a generally flat surface. This makes the panel easy to view and in use the panel is angled at the optimum angle to the vertical for the customer to view the information on the panel.

The display area, and part of the interface area excluding the keys of the calculator or the keyboard, is protected by a transparent cover of a resilient and scratch-resistant material such as polycarbonate. The cover should preferably have a key operated release mechanism to allow access to the display area.

Behind the information panel, the control unit has a power supply, a controller 30 and information receiving 32, storage 34 and output 36 devices. The housing 12 is specially dimensioned and shaped so that it can receive these components.

The power supply comprises a rechargeable power pack 24 which provides electrical power to the control unit including the electronic parts of the information panel 16 and other electronic devices within the housing. The power pack 24 is partly charged by means of solar cells 26 mounted on the top of the handle 10 so that it faces and is charged by the supermarket ceiling lighting when in use.

Because of the size and shape of the housing, to the rear of the information panel, a power pack of a reasonable size can be accommodated so that recharging, by connection of a mains recharging device to a mains source, is only necessary at infrequent intervals (e.g once every 48 hours). However, the appearance of the handle unit is aesthetically pleasing since the bulky power pack is retained behind the information panel.

The controller 30 comprises a microprocessor which controls the information provided to the information panel 16 and in particular the display screen 18. For instance, the controller may cause information to be displayed on the display screen according to a user request via the user interface area, or in a predetermined sequence or in response to trigger signals (see below). The microprocessor accesses the information to be displayed which is stored in memory cells of the information storage device 34. This information may be pre-programmed into the memory by "down loading" information through an information programming device 32b forming part of the information receiving device 32. Alternatively, the information may be received from an external source via a signal receiver 32a forming part of the information receiving device 32 and subsequently stored in the information storage device 34.

The external source may comprise, for example, infra-red or radio wave signals transmitted in store to an infra-red or radio receiver forming the information receiving device in the trolley handle. These signals may be transmitted continuously around the store to provide the latest information on special offers. Alternatively the signals may be transmitted as local trigger signals from various trigger locations around the store to provide particular information about special offers on products around that location. Such trigger signals may also be used to trigger audio sounds from electronic devices within the handle or to trigger the release of artificial smells from the trolley handle.

The control unit may also have memory capacity for storing information entered by the user using the bar code reader 22. Thus the control unit can be used to record the product details and calculate the total value of purchases which are entered by the user using the bar code reader and such information may be readily displayed on the display screen 18.

The handle unit has right and left hand gripping portions 28, 29 which are designed to aid control of movement of the trolley in use.

The handle unit 10 has a coin operated locking mechanism 42 which can be used to lock trolleys together to prevent their theft. Such locking mechanisms are well known in the art and will not be detailed here.

FIGS. 4 and 5 show a second embodiment of the present invention in which parts corresponding to those in the first embodiment have like reference numerals.

In the second embodiment, the handle unit 10 is provided with hand apertures 40 in the molding itself so that the knuckles of the user are protected by guards 27. The hand gripping portions 28, 29 are also shaped to provide a good gripping surface.

The housing 12 is otherwise arranged and shaped as in the first embodiment.

FIGS. 6 and 7 show a third embodiment of the present invention in which parts corresponding to those in the first and second embodiments have like reference numerals.

In this embodiment the handle unit 10 includes a hand aperture 10 to either side of the central housing 12 and has molded hand gripping portions 28 and 29. In this embodiment, an information panel 16 is formed by an electronic liquid crystal displayed screen 18 which is provided at the front of a control unit mounted within the central housing, and is viewed through an aperture in the front face of the central housing. In addition, the remainder of the front face of the control housing is filled in to form a further part of the information panel 16 and on it are mounted a calculator 20 and a paper holder 38 to retain a shopping list.

A coin operated locking mechanism 42 is also included at one end of the handle. A power pack 24 is provided within the central housing 12 to the rear of the information panel 16 which is powered and/or recharged by means of solar cells 26.

Figure 8:
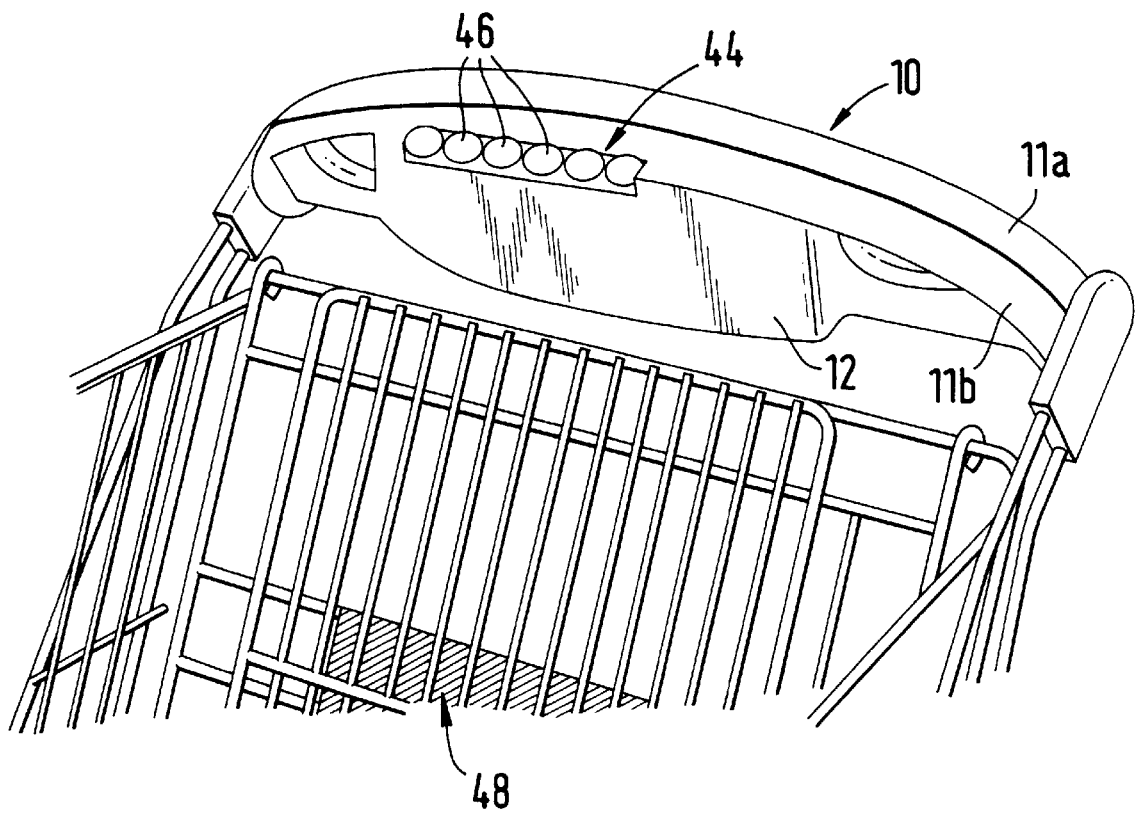
FIG. 8 is a perspective view of a trolley handle unit forming a fourth embodiment of the present invention attached to a shopping trolley.

FIG. 8 shows a perspective view from the rear of a modified version of the handle unit of FIGS. 6 and 7 which forms a fourth embodiment of the present invention. In this embodiment the plastics handle unit 10 is manufactured in two parts 11a and 11b.

In addition a child's toy 44 comprising colored spinning counting beads is incorporated within the handle unit. In use, as shown in FIG. 8, the handle unit is attached to a trolley with its front face forming an angle to the vertical so that information displayed on the information panel 16 can be easily read by a person pushing the trolley. The toy 44 is conveniently situated at the rear upper edge of the handle unit 10 so that, in use, it is positioned in front of a child sitting in the seat 46 provided in a conventional supermarket trolley. The toy can therefore be easily reached and played with by the child.

Although the illustrated handle unit is a modification of the embodiment of FIGS. 6 and 7 it will be appreciated that the toy could be incorporated within any design of handle unit whether with of without a housing 12 as described above. However, the housing 12 as dimensioned in the described embodiments has the advantage that the rear upper edge of the housing 12 is located closer to a child sitting in the conventional child seat than a conventional trolley handle.

The toy shown in FIG. 8 is a simple toy for a young child but it is envisaged that other sorts of toys could be included in the handle unit to cater for children of different ages.

For instance, the toy could be electronically operated by connecting it to the power supply 24 in the control unit 12. Thus, toys which have lights, or make sounds could be used or even popular electronic games having liquid crystal displays could be incorporated within the handle.

It will be appreciated that any suitable toy which is compact and can be used by a child in a seat to amuse him or her could be incorporated within the handle. For instance a cassette player with headphones could be included to play music or tell stories to a child.

Further features which may be included in the handle units of all of the embodiments include an alarm system which sounds when the trolley is taken beyond the premises of the supermarket. This could be done in a number of ways. For instance, a system could be used in which detectors are situated at the exits to the premises and an alarm sounds when the trolley is taken through the exit, in the same way as store security tags cause alarms at the doors of shops to sound.

A further alarm could be provided in conjunction with a safety belt for a child seated in the trolley so that the alarm sounds if the safety belt is undone.

It will be appreciated that many designs of trolley handle unit are possible incorporating the particular features and functions required by a supermarket and to accommodate the technology to be incorporated within the handle unit.

The information panel 16 need not be rectangular but could be circular or oval-shaped. However, the panel should preferably be generally flat and the display area should be of a sufficient size to allow provision of information in an easy-to-read form from the usual distance between the user's eye and the trolley handle when the user is pushing the trolley.

The embodiment in which the molded plastics handle unit 10 is formed in two pieces has the advantage that it's parts can be readily joined together over the tubular handle of a conventional trolley thus allowing a conventional trolley handle to be converted. In addition the original handle provides strength and support for the handle, particularly around the hand gripping portions. Alternatively, the handle unit could be formed from a metallic casting or have strengthening members to provide extra strength if required.

In the case where a conventional trolley handle is not retained, the ends of the handle unit should be tubular and of the same dimensions as a conventional trolley handle so that it can be directly fitted to the trolley frame in the same manner and using the same fittings as a conventional tubular trolley handle.

It will be understood that the display area of the information panel need not be electronically operated but could be a panel area which can retain a printed advertisement. In such a case, the aperture in the front face of the central housing 12 would be filled-in and the information panel 16 would be provided by the front face of the housing rather than the front of the control unit. Alternatively, the information panel may be provided by a revolving advertising display or the like housed within the central housing. Preferably the panel would have a transparent plastics cover to protect the display which can be opened to allow the displayed information to be changed.

Although the described embodiments are formed of molded plastics, it will be appreciated that the trolley handle may be readily formed from other synthetic materials which can be molded such as carbon-fiber materials or foam materials. The skilled person will appreciate that various modifications may be made to the described embodiments, and it is intended to include all such modifications as fall within the scope of the accompanying claims.

I claim:

1. A handle unit for a trolley, comprising: a housing having a front face, a rear face and opposite sides, the front face of the housing including central, generally flat, panel for providing information to a user, a hand gripping portion provided on each of the opposite sides of the housing and formed integrally therewith; the housing being configured to project rearwardly of the panel to the rear face thereof, and a bar-code reader mounted within the housing.

2. A handle unit as claimed in claim 1, formed from a molded synthetic material.

3. A handle unit as claimed in claim 1, in which the housing has a length in the range 21 to 25.5 centimeters, a width in the range 12 to 16 centimeters, and a depth in the range 4 to 7 centimeters.

4. A handle unit as claimed in claim 3, in which the panel has a length of approximately 20 centimeters and a width of approximately 10.5 centimeters and includes a display area having a length of 12 centimeters and a width of 10.5 centimeters.

5. A handle unit as claimed in claim 1, in which at least part of the panel is protected by a transparent cover.

6. A handle unit as claimed in claim 1, in which a toy is provided at an upper edge of the rear surface of the housing.

7. A handle unit as claimed in claim 1, in which the housing contains a power supply.

8. A handle unit as claimed in claim 7, in which the panel includes an electronic display screen connected to the power supply and forming a display area of the panel.

9. A handle unit as claimed in claim 8, in which the panel includes a user interface area.

10. A handle unit as claimed in claim 9, in which the user interface area includes a device adapted for summing the value of prospective purchases of the user.

11. A handle unit as claimed in claim 8, in which the electronic display screen displays information received from the bar-code reader.

12. A trolley incorporating a handle unit as claimed in claim 8.

* * * * *